United States Patent [19]

Berruyer

[11] Patent Number: 4,825,195

[45] Date of Patent: Apr. 25, 1989

[54] METHOD OF MONITORING TO ANTICIPATE THE TRIGGERING OF AN ALARM

[76] Inventor: Yves Berruyer, 94 Boulevard Gabriel Péri, 92240 Malakoff, France

[21] Appl. No.: 44,739

[22] Filed: May 1, 1987

[30] Foreign Application Priority Data

May 7, 1986 [FR] France ................................ 86 06622

[51] Int. Cl.$^4$ .............................................. G08B 29/00
[52] U.S. Cl. .................................... 340/501; 340/511; 340/526
[58] Field of Search ............... 340/501, 500, 506, 510, 340/511, 525, 526, 508, 524; 364/550, 551

[56] References Cited

U.S. PATENT DOCUMENTS

| | | | |
|---|---|---|---|
| 4,184,205 | 1/1980 | Morrow | 364/550 |
| 4,504,920 | 3/1985 | Mickowski | 364/550 |
| 4,514,720 | 4/1985 | Oberstein et al. | 340/511 |
| 4,644,479 | 2/1987 | Kemper et al. | 364/550 |
| 4,668,939 | 5/1987 | Kimura et al. | 340/511 |

FOREIGN PATENT DOCUMENTS 2535492  5/1984  France .

OTHER PUBLICATIONS

NTZ-Archive, May 1981, "Predictive Processor Overload Control Strategies for SPC Switching Systems"; pp. 121–127.

IEEE Proceedings of the International Joint Conference on Pattern Recognition, Nov. 1976.

Primary Examiner—Donnie L. Crosland
Attorney, Agent, or Firm—Oblon, Fisher, Spivak, McClelland & Maier

[57] ABSTRACT

A method of monitoring to anticipate the triggering of an alarm, wherein: an awaited profile is available which represents awaited values of the signal over a predetermined period; the awaited profile is used to estimate the future development of the signal as a function of its values on past dates; the estimated value of the signal is compared for at least one future date at a threshold; and an alarm is triggered if the estimated value is higher than the threshold.

5 Claims, 2 Drawing Sheets

METHOD OF MONITORING TO ANTICIPATE THE TRIGGERING OF AN ALARM

FIELD OF THE INVENTION

The invention relates to a process of monitoring to anticipate the triggering of an alarm. The process applies in a general way to monitoring the amplitude of any physical value which must be kept reliably at a predefined plateau of values, for example, for security reasons. The physical value takes the form of a, for example, electric signal.

The invention applies typically to signals representing a human activity (for example, a signal indicating the intensity of telephone communication on a network of telephone lines) or signals connected with a human activity (for example, control signal for monitoring an electric power station, a refinery, or, in general, any industrial process).

BACKGROUND OF THE INVENTION

The idea of monitoring human activity, or a physical value such as a temperature, a pressure, or the like, is not new. Conventionally monitoring consists in comparing the current value of a signal representing such activity or physical value at one threshold at least, an alarm being triggered if the signal crosses a threshold.

When the alarm is triggered, action is taken either manually or automatically to bring the signal down again below the threshold.

The action being triggered subsequently to the threshold being crossed by the signal, the signal remains above the threshold between the moment the alarm is triggered and the moment when the action taken as a result of the alarm produces its effect. The period during which the signal remains above the threshold may, therefore, be important. This may have harmful consequences to security—more particularly, if the monitored signal indicates temperature or pressure.

The fact that the monitored signal remains above the threshold for a considerable period may also lead to the blocking of the monitored system—more particularly, when the monitored system takes the form of a network, such as a telecommunications network or an electric power supply network.

Such a network comprises nodes interconnected by lines which carry the telephone conversations or electric current. The flow capacity or maximum load of a line being limited, the satisfactory management of the network requires the monitoring of the particular load on each line at any moment to prevent its exceeding a predefined threshold fixed at a value lower than the maximum possible load on the line.

In known manner in the case of a telephone network, the load on a line is regulated by refusing that part of the load which exceeds the threshold. In the case of an electric power transmission network, regulation can consist in modifying the path which the power follows from one node to another. However, this may lead to other line becoming saturated, thus gradually causing a blockage throughout the network.

The general principle of the prior art monitoring methods consists in comparing the current value of the signal with a threshold, an alarm being triggered if the level of the signal is higher than the threshold.

SUMMARY OF THE INVENTION

The monitoring method according to the invention is based on a different principle. It consists in estimating a future value of the signal and in comparing such future value with the threshold. This enables the triggering of the alarm to be anticipated before the value of the signal reaches the threshold, so that quicker action can be taken. In this way it is possible to limit the period during which the signal exceeds the threshold—and even, in certain cases, to prevent the signal from crossing the threshold.

A future value of the signal is estimated by extrapolation, so that the profile of the signal is similar to an awaited profile.

More precisely, the invention relates to a method of monitoring a signal representing the amplitude of a predetermined physical value to trigger an alarm if such signal crosses a predetermined threshold, wherein: an awaited profile is available which represents awaited values of the signal over a predetermined period; the awaited profile is used to estimate the future development of the signal as a function of its values during past time period; the estimated value of the signal is compared for at least one future time period at the threshold; and an alarm is triggered if the estimated value is higher than the threshold.

Preferably, the estimated value of the signal at a given future time period is equal to the value of the awaited profile during that time period, corrected by a coefficient expressing the scale ratio between the actual profile of the signal and its awaited profile.

According to a secondary feature, such scale ratio is equal to the ratio between the maximum amplitude of the signal during a period preceding the current time period and the amplitude of the awaited profile at the time period when the signal has maximum amplitude.

BRIEF DESCRIPTION OF THE DRAWINGS

The features and advantages of the invention will be more clearly gathered from the following, merely illustrative, non-limitative description, with reference to the accompanying drawings, wherein.

DETAILED DESCRIPTION OF THE PREFERRED EMBODIMENTS

In general, the invention consists in anticipating the triggering of an alarm by estimating future values of a measured signal, such estimate being mad in relation to an awaited profile of such signal.

Very clearly, the invention is not limited to a particular field of application, but is applicable whatever the physical value or human activity represented by the measured signal may be.

We take way of example the monitoring of the operation of a telecommunications network. Such monitoring consists in analyzing the traffic passing through the network's automatic exchanges and in analyzing the load on the lines intercommunicating two automatic exchanges.

In this application, the invention enables the telecommunications network management to be warmed in advance that there is a risk that the load on the system will exceed its capacities. The management can therefore take action relating to the configuration of the system for example, adjust the paths between two automatic exchanges in order to solve the potential overload problem before it really arises.

The load on the network is directly bound up with human activity and differs, therefore, by day and night, or on working days and holidays. Conversely, it has been found experimentally that, for a given day of the week, the load on each element of the telecommunications network, whether automatic exchange or lines, is substantially identical in two different weeks.

It is therefore possible to model the load on the telephone network by means of a limited number of load profile models, each model enabling the awaited load for a particular day to be represented.

A number of models, or even one model, may be enough for each particular day. For instance, load profile models are available for each day of the week (Monday, Tuesday, ...), to model a holiday, or to model the eve of a holiday, etc.

In French Patent Specification No. 8 605 139, the Applicant proposed a method of memorizing the charge on a telecommunications network in the course of time, using a minimum volume of data.

In that process, the measured values of the load on a telecommunications network element in the course of a day are replaced by a first value, noting the reference number of the profile model closest to the measured profile, and a second value noting a scale ratio between the measured profile and the profile model.

The idea of a profile model disclosed in that patent application corresponds to the idea of an awaited profile within the scope of the present invention, since, for a given day, the profile model corresponding to that day forms an estimate of the load on the telecommunications network element analyzed. This profile model, or awaited profile, can therefore be used to estimate by extrapolation a future value of the signal analyzed.

Figure 1:
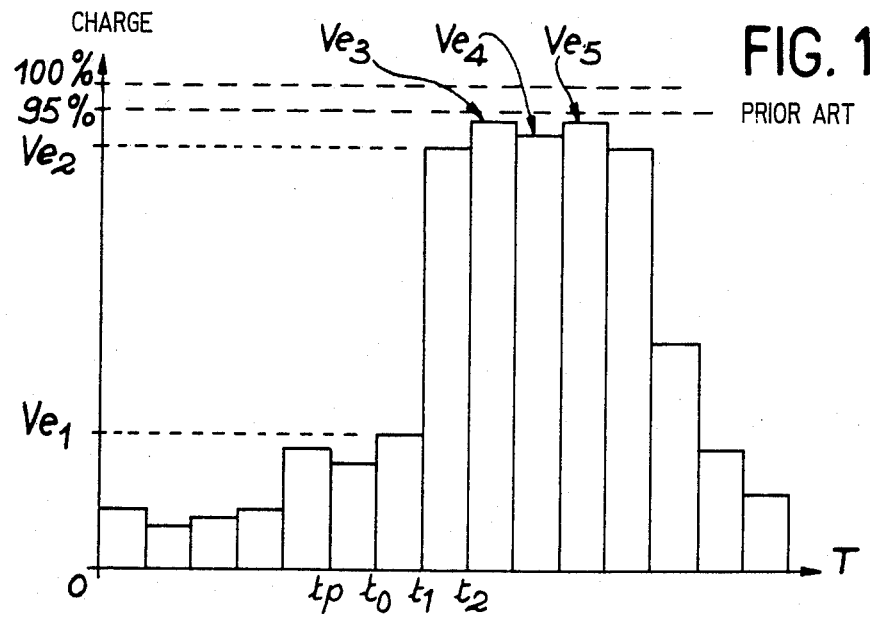
FIG. 1 is a model of a profile, or awaited profile, of the load on a telephone network.

FIG. 1 shows a profile model representing the typical load on lines connecting two automatic exchanges of the telecommunications network for a particular day. This profile model is a histogram containing a sequence of values, each noting the load on the lines for a period of one hour.

Figure 2:
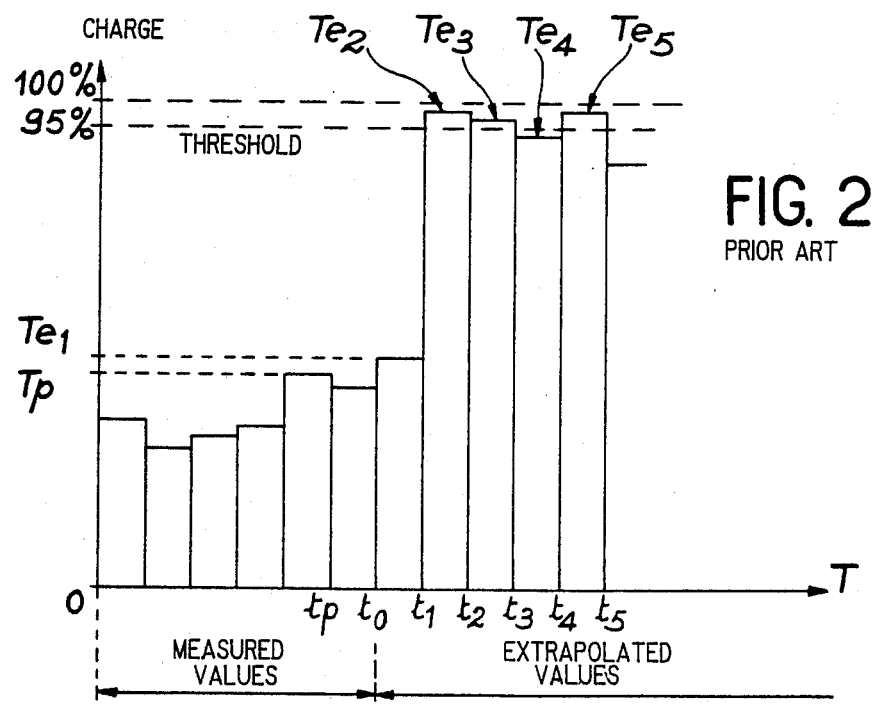
FIG. 2 is a graph of the signal analyzed, wherein the profile corresponding to dates preceding the current date results from measured values, the profile corresponding to dates subsequent to the current date resulting from values extrapolated from the awaited profile.
Figure 3:
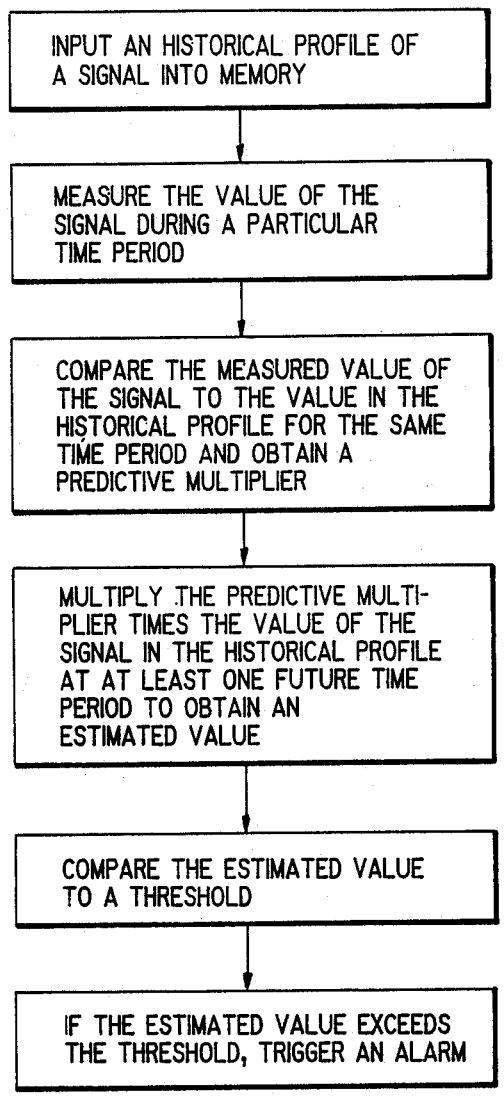
FIG. 3 is a flow chart illustrating the invention.

In the same way FIG. 2 shows the actual value of the load on the lines. More precisely, the values lying between an original time period and the current time period correspond to load values actually measured on the lines, while the values of the signal corresponding to time periods subsequent to the current time period (i.e., during future time periods) are, according to the invention, extrapolated values which are determined as a function of the measured values and the profile model.

These extrapolated values $Te_1$, $Te_2$, $Te_3$, $Te_4$, and $Te_5$ for the successive time periods $t_1$, $t_2$, $t_3$, $t_4$ and $t_5$ are defined, for example, by the following relation:

$$Te_i = Ve_i \cdot T_p / V_p$$

where i is an integer of between 1 and 5 on the drawing, and the values $Ve_i (1 \leq i \leq 5)$ are the values of the profile model for the time periods $t_i (1 \leq i \leq 5)$, $T_p$ is the load measured having a time period $t_p$ preceding the current time period $t_o$, and $V_p$ is the value of the load at the same time period $t_p$ in the profile model.

The ratio $T_p/V_p$ expresses the difference in scale between the measured profile and the awaited profile. Although the ratio can be calculated for any time period $t_p$ preceding $t_o$, it is preferably to choose the moment $t_p$ corresponding to the maximum amplitude of the measured signal (between 0 and $t_o$), so as to obtain better accuracy in the value of such ratio.

FIG. 2 shows the threshold for triggering an alarm. The threshold was selected, by way of example, at a value equal to 95% of the maximum load (100%) which the lines can withstand.

It appears that the load on the lines will probably be higher than the threshold in the interval of time lying between $t_1$ and $t_2$.

The method according to the invention provides a forecast of the threshold being exceeded as soon as the moment $t_o$, thus giving the telecommunications network management the opportunity to take action, for example, on the path tables contained in every automatic exchange, to modify the configuration of the network to prevent the load on the lines analyzed from crossing the threshold.

In comparison with the prior art (in which action is taken only after the signal has crossed the threshold), therefore, the method according to the invention enables earlier and, therefore, more effective action to be taken.

What is claimed is:

1. A method of monitoring a signal representing the amplitude of a predetermined physical value to trigger an alarm if the amplitude of the signal cross a predetermined threshold, wherein:
    (a) an historical profile is available which represents historical values of the signal over a predetermined period;
    (b) the historical profile is used to estimate the future development of the signal as a function of its values during past time periods, thereby obtaining an estimated value of the signal during at least one future time period;
    (c) the estimated value of the signal is compared for the at least one future time period to the threshold; and
    (d) an alarm is triggered if the estimated value is higher than the threshold.

2. A method according to claim 1, wherein the estimated value of the signal at the at least one future time period is equal to the value of the historical profile at that at least one future time period, corrected by a scale ratio between the amplitude of the historical signal and the amplitude of the monitored signal for the same time period.

3. A method according to claim 1, wherein the estimated value of the signal at the at least one future time period is equal to the value of the historical profile at that at least one future time period, multiplied by the ratio between the historical value during a predetermined past time period and the measured value of the monitored signal during the same time period.

4. A method according to claim 3, wherein the predetermined past time period is the time period of the maximum signal measured during the past time periods.

5. A method according to claim 1, wherein the physical value is the load of a telecommunications network element.

* * * * *